E. B. MEYROWITZ.
EYEGLASS MOUNTING.
APPLICATION FILED FEB. 25, 1915.
1,164,300. Patented Dec. 14, 1915.
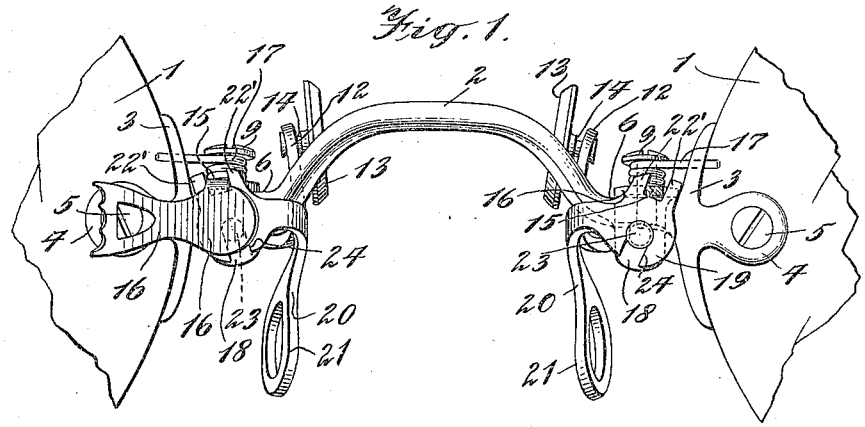
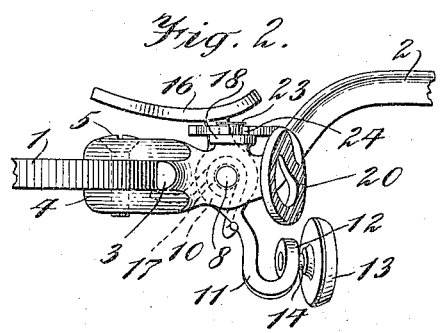
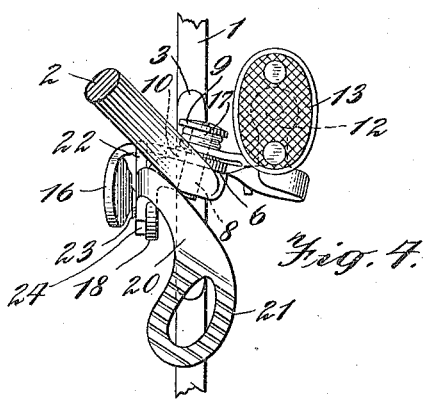
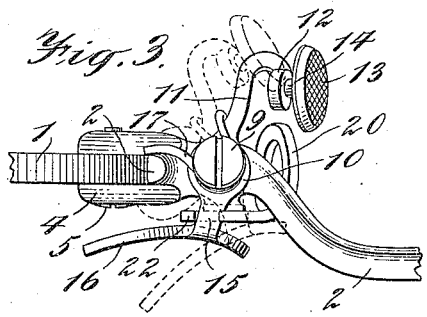
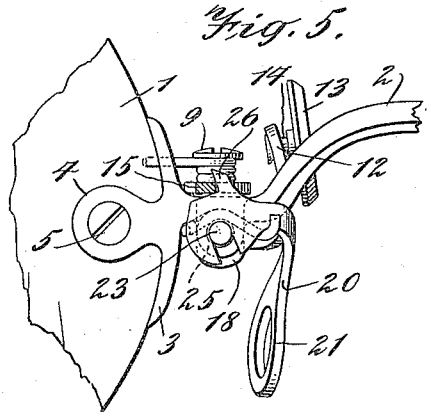

UNITED STATES PATENT OFFICE.

EMIL B. MEYROWITZ, OF NEW YORK, N. Y., ASSIGNOR TO GENERAL OPTICAL COMPANY, INC., A CORPORATION OF NEW YORK.

EYEGLASS-MOUNTING.

1,164,300.   Specification of Letters Patent.   Patented Dec. 14, 1915.

Application filed February 25, 1915. Serial No. 10,408.

*To all whom it may concern:*

Be it known that I, EMIL B. MEYROWITZ, a citizen of the United States, residing at New York city, in the borough of Manhattan and State of New York, have invented certain new and useful Improvements in Eyeglass-Mountings, of which the following is a full, clear, and exact description.

This invention relates to mountings for eyeglasses and spectacles of the types which are provided with relatively movable nose guards which engage and clamp the glasses upon the nose of the wearer, and has for one of its objects the provision of a mounting, whereby the weight of the lenses is more evenly distributed and the glasses more correctly balanced upon the nose than in the former construction where it has been necessary to position the nose-engaging parts of the guards entirely to the rear of the lenses in order to permit them to be opened or spread apart sufficiently to be adjusted upon the nose.

To provide a mounting of this character my invention contemplates utilizing a pair of independently movable nose guards at each end of the bridge instead of the single guard of the known constructions, and in mounting each guard of a pair to swing in a different angular plane. By this construction a nose-engaging piece of each pair of guards can be located at or near the front of the lenses while the other nose piece of each pair can be located more to the rear of the lenses so that when both guards of each pair are swung outwardly, the distance between nose-engaging pieces which engage opposite points on the nose will be equally increased. The glasses may therefore be readily and easily adjusted on the nose and securely held in position without any danger of their tilting or slipping off the nose, or otherwise being accidentally displaced. The guards of a pair may be arranged to be actuated by a single spring, or each guard may be provided with a separate spring, and therefore have an independent gripping action.

More specifically, my invention has special application to a finger-piece mounting, and in this connection it contemplates a construction in which the guards of each pair are interconnected so that they may be opened simultaneously by the movement of a single finger-piece.

In the accompanying drawings, I have illustrated one embodiment of my invention showing its adaptation to a finger-piece mounting, in which:

Figure 1 is a side elevation of a mounting of this character, as viewed from in front of a pair of eye-glasses, only a portion of the lenses being shown; Fig. 2 is a detail showing in bottom plan one-half of the mounting; Fig. 3 is a similar view showing a top plan; Fig. 4 is a detail showing an end elevation of one-half the mounting, as is disclosed in Figs. 2 and 3; and Fig. 5 is a detail showing in side elevation a modified form of mounting in which each guard is actuated by a separate spring.

As is the usual construction, lenses 1—1 of the eye-glasses are connected by a support which in the embodiment shown comprises a non-resilient metallic bridge 2 provided at each end with straps 3 and clips 4, to which the lenses are secured by screws 5. The portions of the bridge 2 adjacent the straps 3 furnish the usual seats or supports 6 upon which the nose guards are mounted, which are of a similar construction at each end of the bridge. As shown in Fig. 4, the seat 6 is inclined slightly to the horizontal and has projecting upwardly therefrom a post or stud consisting of a threaded screw 8 having an enlarged head 9. Pivotally mounted upon this post is one of the nose guards, which comprises a flat circular hub portion 10 surrounding the post and resting directly upon the seat 6, and a guard arm 11 consisting of a thin narrow metallic strip forming a continuation of the hub. This strip is twisted at right angles to the hub and extends to the rear of the lens in a plane substantially perpendicular thereto. The upper end of the strip or arm is curved upwardly as at 12, and carries at its upper outer end a nose pad 13, which is connected to the arm by means of a headed stud 14 carried by the back of the pad, which stud passes loosely through a hole in the end of the guard arm so that the pad may adjust itself to the shape of the wearer's nose. Extending from the hub 10 at a point opposite the guard arm is a second arm 15 which carries at right angles thereto a depending finger piece 16, consisting of a curved enlarged portion of the arm 15 of sufficient size to permit it to be readily engaged by the fingers. The post 8 above the hub of the guard arm is surrounded by a closely coiled spring 17, one end of which is held stationary by its engagement with the lens strap while the other end is hooked over the guard arm 11 at a point adjacent its connection with its hub so that the tension of the spring is exerted to continually urge the guard arm inwardly and force its nose pad into a position to grip the nose when the glasses are on the wearer. This spring also serves to hold the hub upon its seat by its engagement with the head 9 of the screw 8 which may be adjusted to obtain the desired pressure.

The construction thus far described is similar to the usual finger piece mounting which is at present used, and while the shape of the nose-engaging piece or pad may be of a different shape and configuration, as for example, a somewhat elongated piece, yet whatever construction has been employed it has been found necessary to mount the nose guards so that all portions of the nose-engaging pieces or pads are on the same side of the pivotal points of the guard arm, i. e., to the rear of the lenses, for if the nose-engaging pieces were constructed so as to extend to both sides of their pivotal points, then upon movement of the finger pieces only the rear portions of the nose-engaging pieces would separate, while the forward portions would approach each other, leaving an insufficient space between them to permit the glasses to be fitted properly upon the bridge of the nose. This same difficulty is encountered when a portion of each of the nose-engaging pieces lies in a plane passing through or adjacent to the pivots and parallel to the faces of the lens, since the portions of a piece which are at the greatest distance from the pivotal point will turn through the greatest distance or arc, while those portions which are adjacent the plane of the pivot will have only a slight travel and will not spread sufficiently apart to permit the glasses to be correctly adjusted. The mounting of the nose-engaging pieces entirely to the rear of the lenses, however, causes the weight of the lenses to exert a cantaliver action upon the nose-engaging parts or pieces which must therefore tightly grip the nose in order to prevent the glasses from tilting and slipping, which with some shapes of noses is virtually impossible. In my invention these difficulties are overcome by providing an additional independently movable nose guard at each end of the support, which nose guards are adapted to swing in a plane substantially at right angles to the first mentioned guards and to engage a portion of the nose directly beneath the lens or to the front of the same, so that they sustain the weight of the glasses while the guards before described which are positioned to the rear of the lenses are utilized to hold the glasses from accidental displacement. A separate seat is provided for each of these additional guards on the bridge 2 by means of a lip 18 which forms a continuation of the seat 6 but is bent approximately at a right angle thereto so that its surface is substantially parallel to the face of the lens. Pivotally mounted upon this seat is a nose guard comprising an enlarged circular head or plate 19 from which a guard arm 20 depends. The guard arm carries at its lower end a nose-engaging part or piece 21, the surface of which is serrated, and is preferably provided with an opening so that it will securely engage the nose without slipping. The arm of the guard and its head are bent at right angles so as to bring the nose-engaging piece in the correct position to engage the nose. To permit an easy assembling of parts and yet to pivotally mount this guard arm, the seat is provided with a projecting stud or post 22 having a conically shaped head 23. The head 19 of the guard is provided with a slot 24 of a width slightly less than the enlarged head, which slot extends inwardly from the periphery of the circular plate to its center. The stud or post 22 enters this slot and rests in the inner end thereof so that the guard may turn freely thereon. The guard is maintained in this position by means of the pressure which is exerted upon the head 19 of the guard at the point opposite the slot by means of the arm 15, which fits into and bears upon the bottom of a recess formed between two spaced lugs 22', the arm 15 being held in a position to exert a pressure upon the head by means of the coiled spring 17, as before described. The conically shaped head 23 of the post is engaged by the wall of the slot 24, which will also tend to force the head 19 against its seat 18, and so will prevent the displacement of the guard. The spaced lugs 22' form the fork between which the arm 15 fits and also serve as an interconnection between the two guards of a pair, and when the finger piece 16 is moved the guard arm 11 and its nose pad or piece 13 is moved outwardly, as is also the guard arm 20 and its nose-engaging part or piece 21. Due to the construction described, however, the guard arms move in different angular planes, the arm 11 moving in a plane substantially perpendicular to the face of the lens, while the arm 20 moves in a plane parallel thereto. The result of this construction is that each of the nose-engaging parts may be positioned at a point remote from their pivotal point of attachment to the support and so turn through a relatively large arc when they are moved by the finger piece. The nose pieces 21 may therefore be positioned directly in vertical alinement with the lenses and have portions thereof extending out in front of the same, as is disclosed in Fig. 4, and yet when the finger pieces are actuated they will separate a sufficient distance to permit the glasses to be properly adjusted upon the bridge of the nose.

The modified construction shown in Fig. 5 is in general similar to that described, but differs therefrom in the provision of an additional spring 25 for the guard arm 20, which, as is shown in this view, surrounds the post 22, one end of the spring being held stationary against the strap while the other end is hooked around a portion of the guard arm. Instead of providing two spaced lugs, as in the former construction, only one lug 26 is used, otherwise the construction is identical. When this form of mounting is used and the eye-glasses have been adjusted to the proper point upon the nose and the finger pieces released the nose-engaging pieces 21 which engage the bridge of the nose will, due to the character of the surface with which they engage, come to rest first and will be held in firm gripping relation by means of the springs 25. The movement of the guard arms 11 will continue, since in the return movements of the guards they have an independent movement due to the tension of the springs 17, and the nose pads 13 will obtain a firm grip upon the fleshy portions of the nose above the bridge; each guard is therefore held in place under the tension of a separate spring, and since they are permitted this independent gripping action the glasses will be more tightly and securely held in place.

In both constructions, due to the mounting of the nose pieces 21 parallel to the lenses, the lenses will be held in the correct position before the eyes, since any slipping of these parts would cause the lens to be lifted rather than to fall, which in a large measure will be offset by the weight of the lenses acting in the opposite direction. The fact that the nose-pieces engage the nose at right angles to each other is also of advantage in preventing the glasses from slipping, since the gripping action of the nose pieces 21 tends to force the nose pads 13 toward the face of the wearer and therefore permits them to secure a firmer hold upon the fleshy portions of the nose.

While I have disclosed my invention in connection with a finger-piece mounting, yet it is clear that the use of two independently movable nose guards which are adapted to engage with the same side of the nose, may be used with other forms of mountings for eye-glasses and spectacles, and it is not my intention to be limited to the specific embodiments shown, but only by the scope of the claims which are appended hereto.

I claim:

1. The combination with a pair of lenses, of a mounting comprising a support connecting the lenses, and a pair of movable nose guards at each end of the support comprising guard-arms and nose engaging pieces, one of said guard arms of a pair being mounted to swing in a plane parallel to the lenses and the other guard arm of a pair in a plane at right angles thereto.

2. The combination with a pair of lenses, of a mounting comprising a support connecting the lenses, and a pair of movable nose guards at each end of the support, comprising guard arms and nose engaging pieces, said guard arms of a pair being mounted to swing in angularly disposed planes.

3. The combination with a pair of lenses, of a mounting comprising a support connecting the lenses, a pair of spring-actuated nose guards mounted at each end of said support to swing in angularly disposed planes, and means for simultaneously moving said guards against the spring tension.

4. The combination with a pair of lenses, of a mounting comprising a support, a pair of spring-actuated nose guards at each end of said support having their guard-arms separately pivoted to the support, and connections between said guard arms for simultaneously moving them against the spring tension.

5. The combination with a pair of lenses of a mounting comprising a support, a pair of spring-actuated nose guards at each end of said support having their guard-arms separately pivoted to the support, connections between said guard arms for simultaneously moving them against the spring tension, and a finger piece connected to one of said guards.

6. The combination with a pair of lenses, of a mounting comprising a support, and a pair of nose guards at each end of said support, comprising a nose-engaging piece positioned entirely to the rear of the lenses, and a nose-engaging piece positioned in alinement with said lenses, and means for pivoting said nose-engaging pieces on said support to swing through substantially equal arcs.

7. The combination with a pair of lenses, of a mounting comprising a support, and a pair of nose guards at each end of said support, comprising a nose-engaging piece positioned entirely to the rear of said lenses, and a nose-engaging piece having at least a part thereof disposed to the front of the lenses and means for pivoting said nose-engaging pieces on said support to swing through substantially equal arcs.

8. The combination with a pair of lenses, of a mounting comprising a support, a pair of spring-actuated nose guards at each end of said support, a finger piece carried by one guard of each pair, and means associated with the other guard of each pair for operating it when the first named guard is operated by said finger piece.

In witness whereof, I subscribe my signature, in the presence of two witnesses.

EMIL B. MEYROWITZ.

Witnesses:
F. L. HIGGINS,
A. C. MOESCHEN.

Copies of this patent may be obtained for five cents each, by addressing the "Commissioner of Patents, Washington, D. C."